(12) United States Patent
Zhou et al.

(10) Patent No.: US 6,856,989 B1
(45) Date of Patent: Feb. 15, 2005

(54) DYNAMIC LINK

(75) Inventors: Ming Zhou, Fremont, CA (US);
Wenbing Zhang, Fremont, CA (US);
Chien-yu Lin, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 0 days.

(21) Appl. No.: 09/545,045

(22) Filed: Apr. 7, 2000

(51) Int. Cl.[7] .............................................. G06F 17/30
(52) U.S. Cl. ......................... 707/9; 707/102; 709/216; 713/201
(58) Field of Search .................... 707/1–10, 100–104.1, 707/200–206; 713/165, 201, 594; 709/211, 216, 2, 238

(56) References Cited

U.S. PATENT DOCUMENTS

| | | | | | |
|---|---|---|---|---|---|
| 5,706,510 A | * | 1/1998 | Burgoon | ..................... | 707/203 |
| 5,721,908 A | * | 2/1998 | Lagarde et al. | ................ | 707/10 |
| 5,802,518 A | * | 9/1998 | Karaev et al. | .................. | 707/9 |
| 5,819,271 A | * | 10/1998 | Mahoney et al. | ............. | 707/10 |
| 5,819,285 A | * | 10/1998 | Damico et al. | .......... | 707/104.1 |
| 5,822,539 A | * | 10/1998 | van Hoff | ..................... | 709/236 |
| 5,918,227 A | * | 6/1999 | Polnerow et al. | ............. | 707/10 |
| 5,956,715 A | * | 9/1999 | Glasser et al. | .................. | 707/9 |
| 6,014,696 A | * | 1/2000 | Araki et al. | ................. | 709/219 |
| 6,016,491 A | * | 1/2000 | Kou | ............................... | 707/9 |
| 6,278,449 B1 | * | 8/2001 | Sugiarto et al. | ............ | 709/203 |
| 6,308,173 B1 | * | 10/2001 | Glasser et al. | .................. | 707/9 |
| 6,321,219 B1 | * | 11/2001 | Gainer et al. | .................. | 707/3 |
| 6,327,628 B1 | * | 12/2001 | Anuff et al. | ............. | 707/501.1 |

OTHER PUBLICATIONS

"Symbolic Link", Focus on Unix paper, downloaded from Internet, http://unix.about.com/library/glossary/bldef–symbolic–link.htm, 4 pages.

"Hard Link", Focus on Unix paper, downloaded from Internet, http://unix.about.com/library/glossary/bldef– hard–link.htm.

Jennifer Walsh, "Redirect or Symbolic Link?", paper downloaded from Internet, http://hotwired.lycos.com/webmonkey/templates/print_template.html?meta=/webmonkey/97/13/index4a_meta.html, 3 pages.

"In Unix, what is a symbolic link, and how do I create one?", Indiana University Knowledge Base, downloaded from Internet, http://kb.indiana.edu/data/abbe.html, 2 pages.

"In Unix, what is a hard link?", Indiana University Knowledge Base, downloaded from Internet, http://kb.indiana.edu/data/aibc.html?cust=434985.04248.131, 2 pages.

"Building ISAPI Filters and the CVTDOC Sample" downloaded Mar. 6, 2000 from <http://msdn.microsoft.com/workshop/networking/isapi/isfilter.asp> (12 pages).

* cited by examiner

*Primary Examiner*—Shahid Alam
*Assistant Examiner*—Jean Bolte Fleurantin
(74) *Attorney, Agent, or Firm*—Patent Law Group LLP; David C. Hsia

(57) ABSTRACT

A file system for file sharing includes a web server that creates a temporary directory for each session between the web server and a client computer. When the client computer requests a file located in a file server, the web server creates a symbolic link to the file in the temporary directory and a web page including an URL to the symbolic link. The web server transmits the web page, and therefore the file, to the client computer. Client computer can also upload files to the web server. The web server saves the uploaded files to the temporary directory and then moves the files to the file server. At the end of the session, the web server deletes the temporary directory. Thus, files are not saved on the web server and therefore not accessible to others from the Internet. In this file system, file and directory names are orderly incremented in the file server to simplify the back up process of the file server. Furthermore, previously backed up directories are checked for their current size to determine if they should be backed up again. By backing up previously backed up directories that are now smaller speeds up the restoration of file serve when necessary.

10 Claims, 10 Drawing Sheets

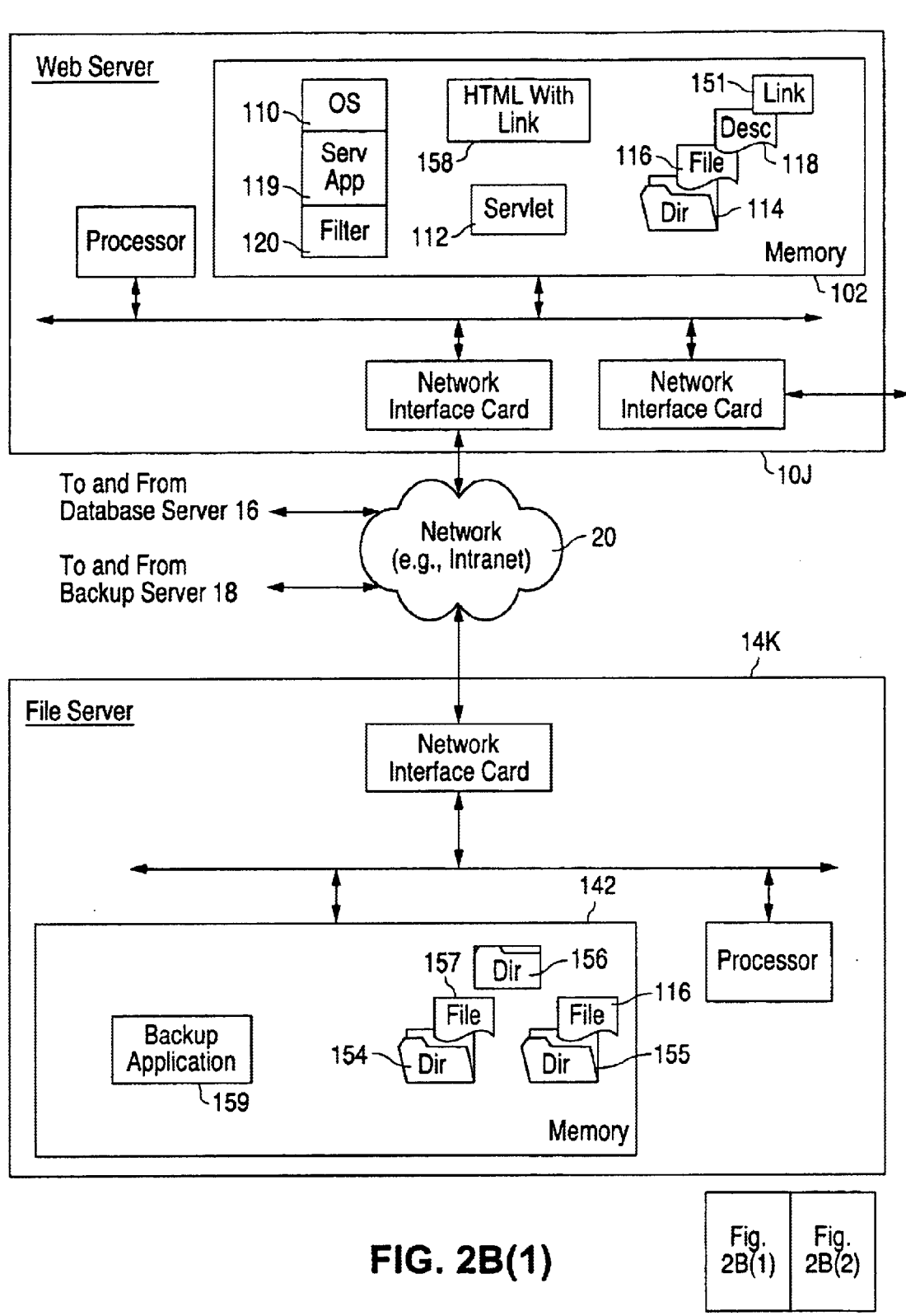
FIG. 2B(1)

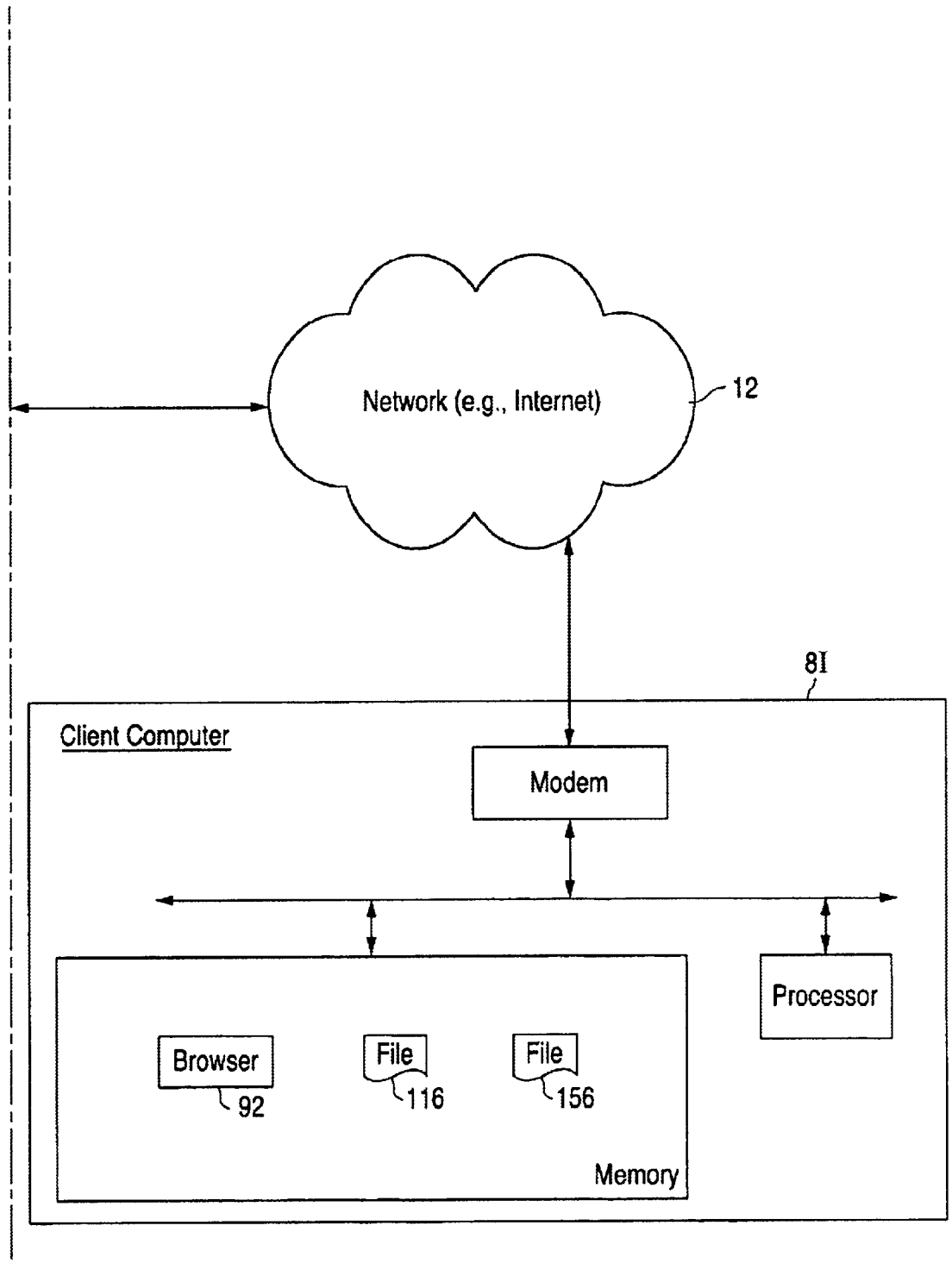
FIG. 2B(2)

DYNAMIC LINK

BACKGROUND

1. Field of Invention

The present invention relates to file sharing and more particularly to the use of dynamic links for secure and efficient file sharing over the Internet.

2. Description of Related Art

Many businesses offer file sharing over the World Wide Web on the Internet ("the Internet"). For example, there are businesses operating web sites that allow people to share their photos with friends and loved ones over the Internet. Typically, a user uploads his or her image files to a web server. The web server stores the image files in a directory in a local hard drive.

To control access to the image files, the web server uses directories with long and static directory names that are chosen in no recognizable order. For example, a web server assigned to the domain name of "www.sharephoto.com" saves an image file named "myphoto.jpg" in a directory randomly named "14987478." Thus, one must know the entire path of "www.sharephoto.com/14987478/myphotog.jpg" to access the image file "myphoto.jpg" on the web server. The web server provides the long directory name to the user that has the correct login ID and password.

The above system is subject to brute force attacks. An unauthorized user can try various directory and file names to eventually gain access to the files. Once the directory and file names are discovered, anyone can use them to repeatedly gain access to the files because the directory and file names are static (e.g., do not change). Furthermore, the above system is difficult to back up because the directory names are chosen in no recognizable order. Thus, meticulous records of the files and directories must be kept and sophisticated methods used to back up the web server. Accordingly, a system that protects Internet file sharing and uses a simple back up method is needed.

SUMMARY

In accordance with one aspect of the invention, a method for file sharing over a network includes receiving a request for a first file from a first computer to a second computer via the network, wherein the file is on a third computer, determining whether a user on the first computer is permitted access to the first file, creating a link on the second computer to the first file in response to the file request if the user is permitted access to the first file, creating a web page description including an URL to the link, and transmitting the web page description to the first computer via the network. The method also includes creating a directory with a directory name that is at least partially random and saving the link in the directory. The method further includes deleting the directory after transmitting the web page description to the first computer.

In accordance with another embodiment of the invention, a system for file sharing over a network includes a file-transfer agent coupled to a network, a first storage coupled to the file transfer agent, a file management agent coupled to the file transfer agent, and a second storage coupled to the file management agent. The second storage stores a file. The first storage includes a temporary directory storing a link to the file on the second storage. The file transfer agent includes an HTML page having an URL to the link.

Other aspects and advantages of the present invention will become apparent from the following detailed description and accompanying drawings.

BRIEF DESCRIPTION OF THE DRAWINGS

FIG. 2B is a block diagram of the client computer, the web server, and the file server of FIG. 2A.

Use of the same reference symbols in different drawings indicates similar or identical items.

DETAILED DESCRIPTION

Figure 1:
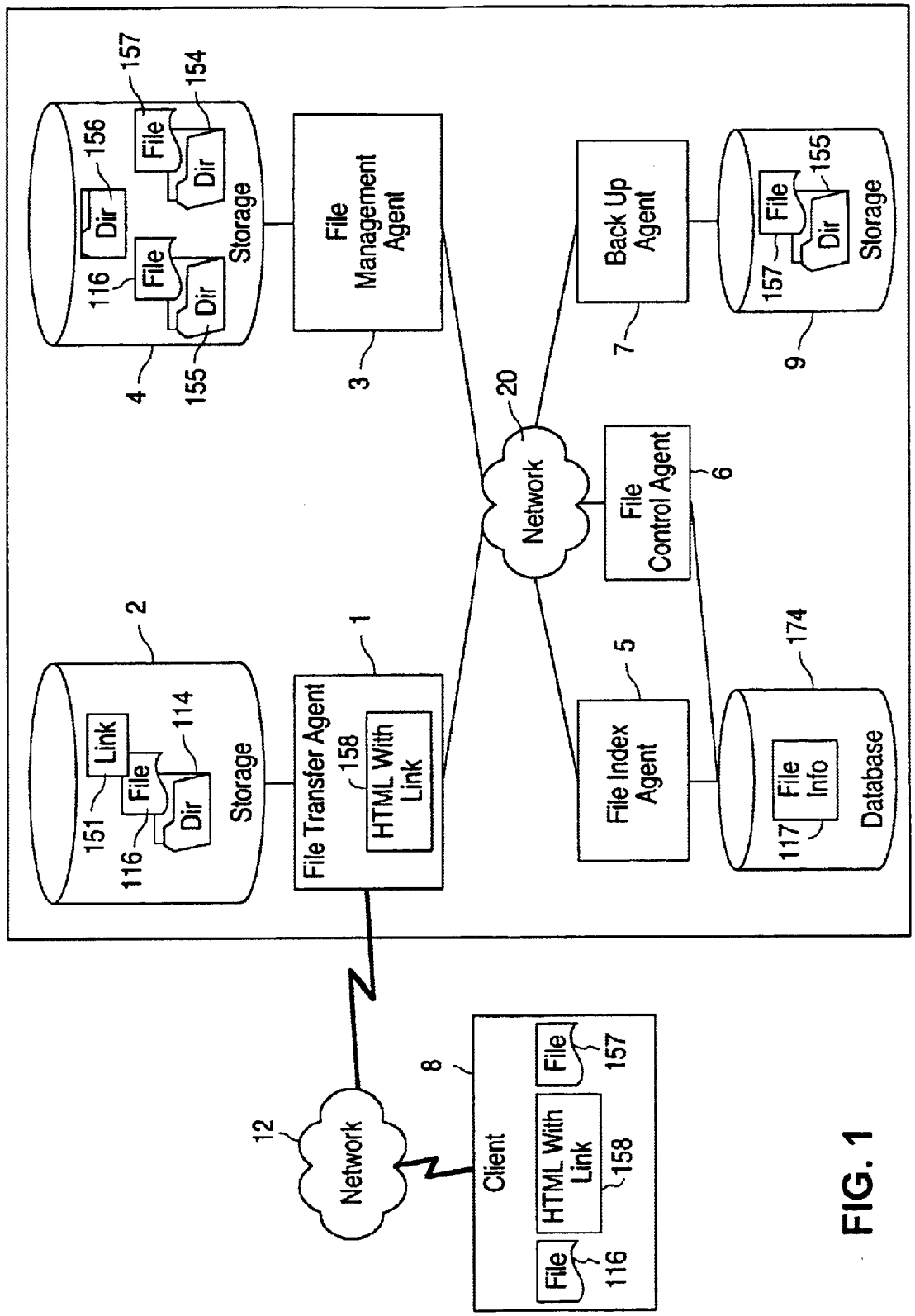
FIG. 1 is a block diagram of a file sharing system in accordance with one embodiment of the present invention.

In accordance with one aspect of the invention, a file transfer agent 1 (FIG. 1) creates a temporary directory ("session directory") 114 in a storage 2 when a client 8 begins a session with file transfer agent 1 over a network 12. When client 8 uploads a file 116 to file transfer agent 1, file transfer agent 1 saves file 116 in session directory 114 and then moves file 116 to a file management agent 3 over a network 20. File management agent 3 in turn saves file 116 in a directory 155 in a storage 4. When the session ends between file transfer agent 1 and client 8, file transfer agent 1 deletes session directory 114. Thus, file transfer agent 1 does not keep file 116 in storage 2 after the session ends.

In accordance with another aspect of the invention, file transfer agent 1 (FIG. 1) creates a symbolic link 151 in session directory 114 when client 8 requests a file 157 in a directory 154 on storage 4. Symbolic link 151 maps a URL (uniform resource locator) to a network drive path of file 157. File transfer agent 1 then generates an HTML (hypertext markup language) page 158 that has a normal URL with a hypertext link to symbolic link 151 and transmits HTML page 158 (and therefore file 157) to client 8. Thus, file transfer agent 1 does not keep file 157 in storage 2.

In accordance with another aspect of the invention, file management agent 3 saves file 116 to a file location in directory 155 provided by a file control agent 6 over network 20. File control agent 6 always provides a new file name and a new file location for each file, even if the file is an update of an old file. File management agent 3 transmits file information 117 (e.g., file size) of file 116 to a file index agent 5. File index agent 5 stores file information 117 in a database 174. When a directory (e.g., directory 155) reaches a predetermined capacity (e.g., a predetermined size or a predetermined number of files), file control agent 6 instructs file management agent 3 to create a new directory (e.g., directory 156) in storage 4. File control agent 6 instructs file management agent 3 to create the new directory (e.g., directory 156) with a directory name that is next in a sequence of directory names. For example, if the name of the directory 155 is a number, the name of the directory is the next number. Thus, file control agent 6 uses an orderly and coherent directory naming system.

In accordance with another aspect of the invention, a back up agent 7 copies the files and directories on storage 4 to a storage 9 as a backup. Back up agent 7 backs up all the directories that have not been backed up except the newest directory that is being used to save files (e.g., directory 156). Back up agent 7 easily determines the directories that have not been backed up by examining the directory names of the last backed up directory (e.g., directory 154) and the newest directory (e.g., directory 156). The directories (e.g., directory 155) that have not been backed up are those with directory names between the directory names of the last backed up directory and the newest directory since the directories names are sequential. Back up agent 7 also determines whether deletion of files has decreased the capacity of any previously backed up directories below a predetermined threshold. If so, back up agent 7 again backs up those directories and deletes the old back-up directories to save space and increase the speed of restoring those directories if necessary. Thus, back up agent 7 provides a simple back up method that improves performance.

Figure 2A:
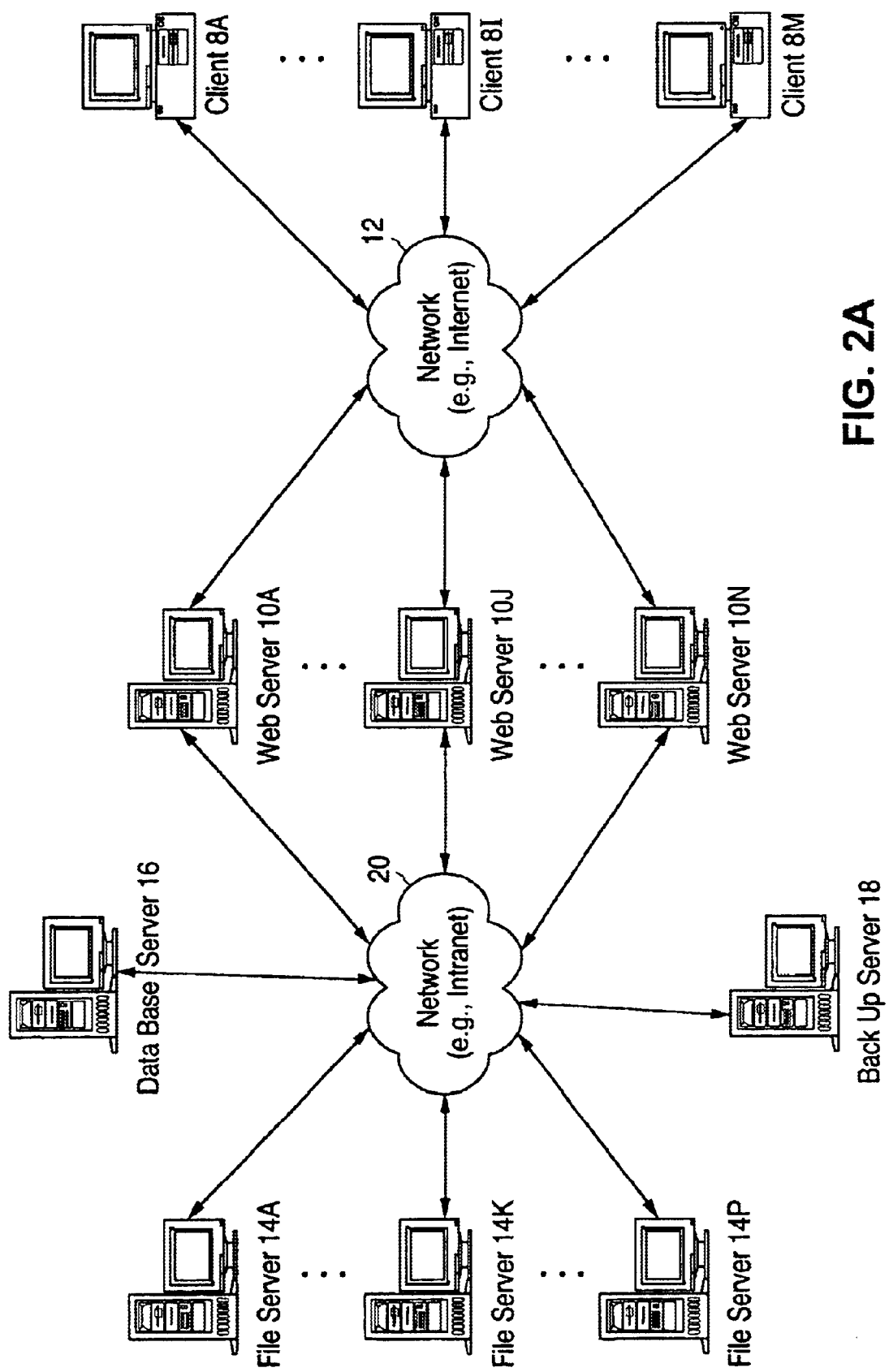
FIG. 2A is a block diagram of one implementation of the system of FIG. 1.

FIG. 2A illustrates a system for implementing an embodiment of the present invention. In FIG. 2A, one or more web servers 10A . . . 10J . . . 10N implement file transfer agent 1, storage 2, file management agent 3, and back up agent 7 (FIG. 1). One or more file servers 14A . . . 14K . . . 14P implement storage 4. Database server 16 implements file index agent 5, database 174, and file control agent 6. Back up server 18 implements storage 9.

In this embodiment, client 8 (FIG. 1) is any one of client computers 8A . . . 8I . . . 8M. Network 12 is, for example, the Internet. Network 20 is, for example, an intranet such as a LAN (local area network) or a WAN (wide area network).

Figure 2C:
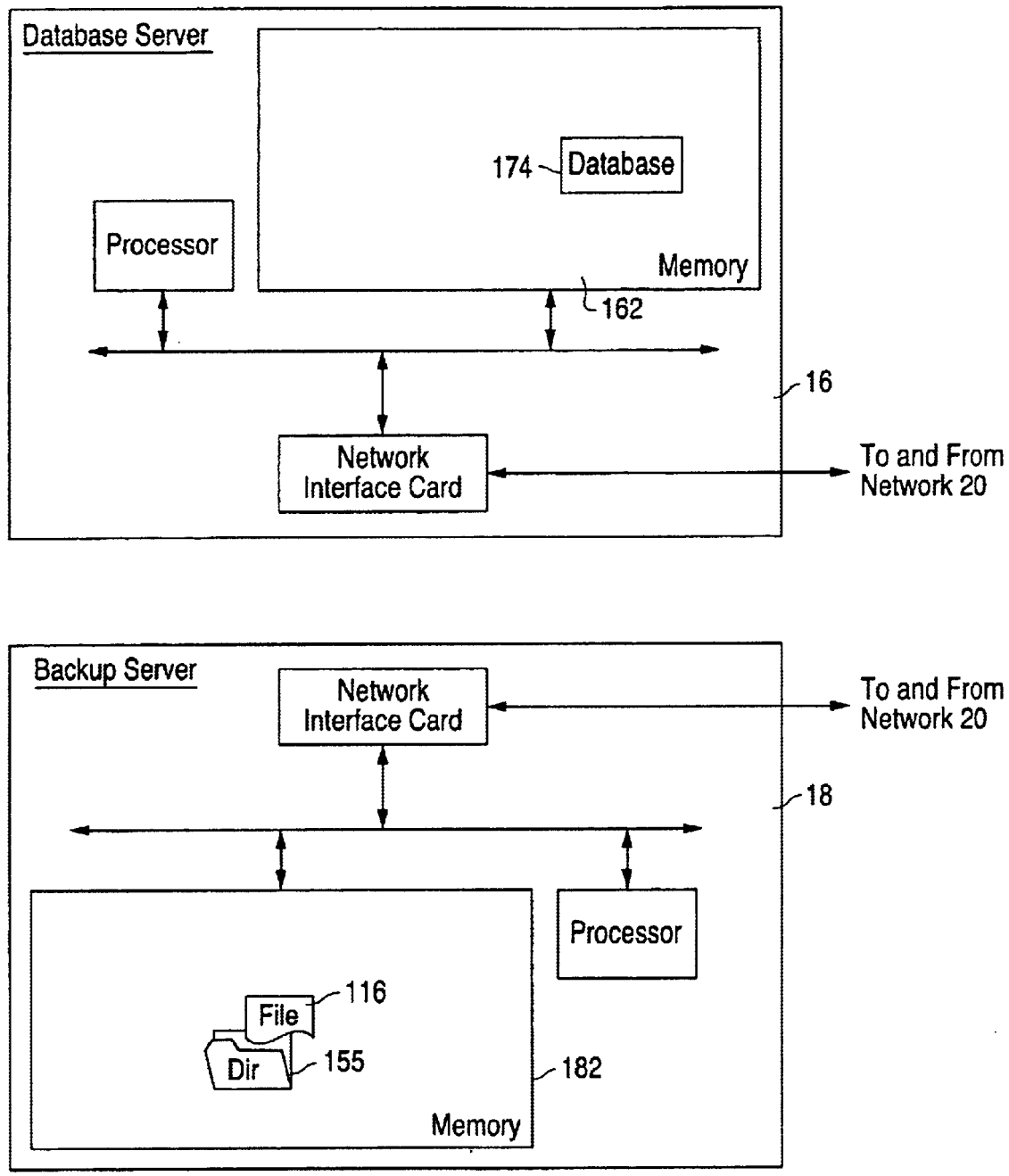
FIG. 2C is a block diagram of the database server and the backup server of FIG. 2A.
Figure 3A:
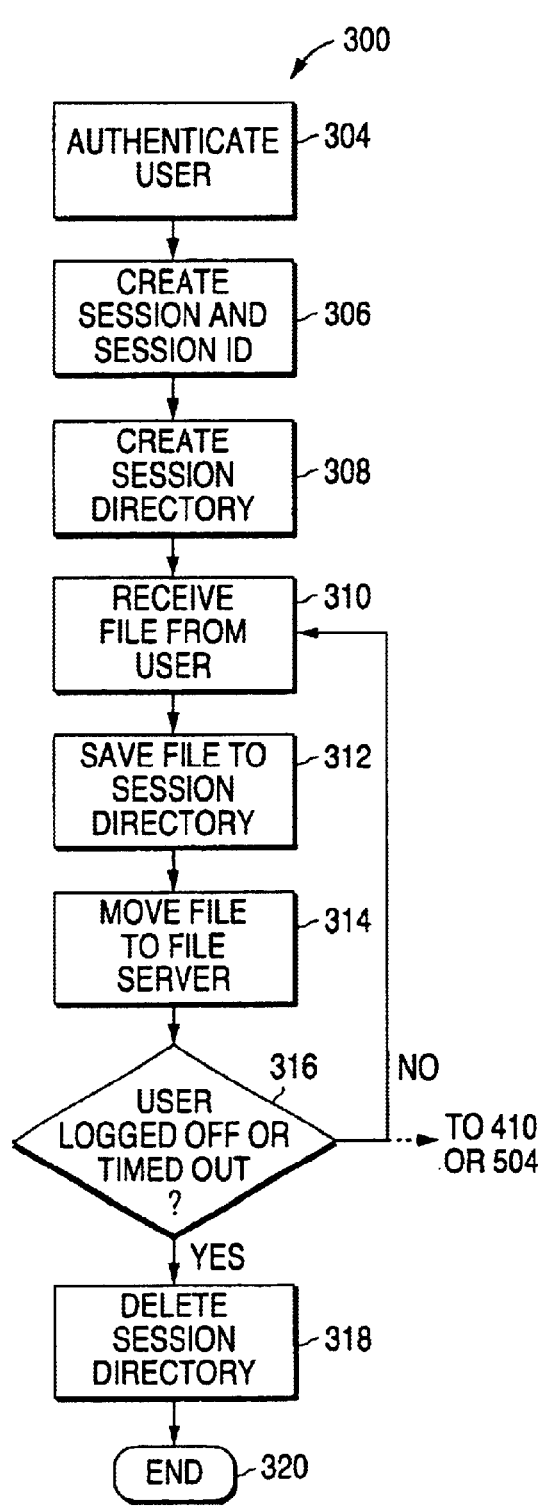
FIGS. 3A and 3B are flow charts illustrating the operation of the file transfer agent of FIG. 1.

FIG. 3A illustrates a method 300 for receiving file 116 from a user. In an initial action 304, a servlet 112 (FIG. 2B) executed in server 10J conventionally authenticates a user accessing server 10J from client computer 8I. In one implementation, servlet 112 authenticates a user by comparing the username and password received via network 12 with the usernames and passwords in database 174 (FIG. 2C) in memory 162 (e.g., includes RAM and hard disk storage) of database server 16. Database 174 is, for example, Oracle® 8.06 by Oracle Corporation of Redwood Shore, Calif. Following action 304, in action 306, servlet 112 conventionally creates a session for the user and gives the session a random session ID. Servlet 112 also saves the user's user ID as a session object in memory 102. Session objects are data saved by a servlet for use during a session. The user ID is associated with the username and stored together in database 174.

In action 308 that follow action 306, servlet 112 creates a session directory 114 (FIG. 2B) in a memory 102 (e.g., includes RAM and hard disk storage). Session directory 114 is a temporary directory that servlet 112 deletes at the end of the session. In one implementation, servlet 112 creates session directory 114 with a directory name based on the user ID and a randomly generated string (e.g., the session ID). The combination of the user ID and the randomly generated string provides a unique directory name that is difficult to guess. In another implementation, servlet 112 creates session directory 114 with a directory name that is totally random.

In the next action 310, servlet 112 receives a file 116 (FIG. 2A) from client computer 8I via network 12. In one variation, where file 116 is an image file (e.g., a JPEG file), servlet 112 also receives user file description 118 that includes a picture name, a picture caption, a picture description, and picture keywords. Servlet 112 receives file description 118 when the user enters information into a form presented by a browser 92 on client computer 8I and transmits the information to web server 10J.

In the next action 312, servlet 112 saves file 116 to session directory 114 while maintaining user file description 118 in RAM (e.g., part of memory 102). In one implementation, servlet 112 checks file 116 for unacceptable conditions including unacceptable file formats, unacceptable file sizes, and unacceptable file content (e.g., unacceptable image resolutions). After action 312, in an action 314, servlet 112 conventionally moves file 116 to directory 155 in a memory 142 (e.g., includes RAM and hard disk storage) of file server 14K. In one implementation, servlet 112 also augments file description 118 to include directory and file names of directory 155 and file 116 and saves user file description 118 to database 174 of database server 16. Action 314 is followed by action 316. In action 316, servlet 112 determines whether the user on computer 8I has logged off or timed out (e.g., was inactive for 30 minutes). If the user has either logged off or timed out, action 316 is followed by action 318. Otherwise, action 316 is followed by action 310, or optionally by action 410 (described later in reference to FIG. 3B) or action 504 (described later in reference to FIG. 5) depending on the user. The user may select among actions 310, 410, and 504 via web pages provided by web server 10J. In action 318, servlet 112 deletes session directory 114 and any files contained therein. After action 318, method 300 ends in action 320.

Method 300 provides a secure way for the user to upload his or her files for sharing. As described above, servlet 112 creates session directory 114 with a dynamic directory name based on the user ID and the current session ID. Servlet 112 only temporarily saves file 116 in session directory 114 and deletes session directory 114 and any files therein at the end of the session. For an unauthorized user to access file 116 from web server 10J, he or she must (1) log onto web server 10J at the same time as the authorized user, (2) know the directory name of session directory 114 (which requires knowing the user ID and session ID of the authorized user), and (3) copy file 116 from session directory 114 before servlet 112 moves file 116 to file server 14K.

Figure 3B:
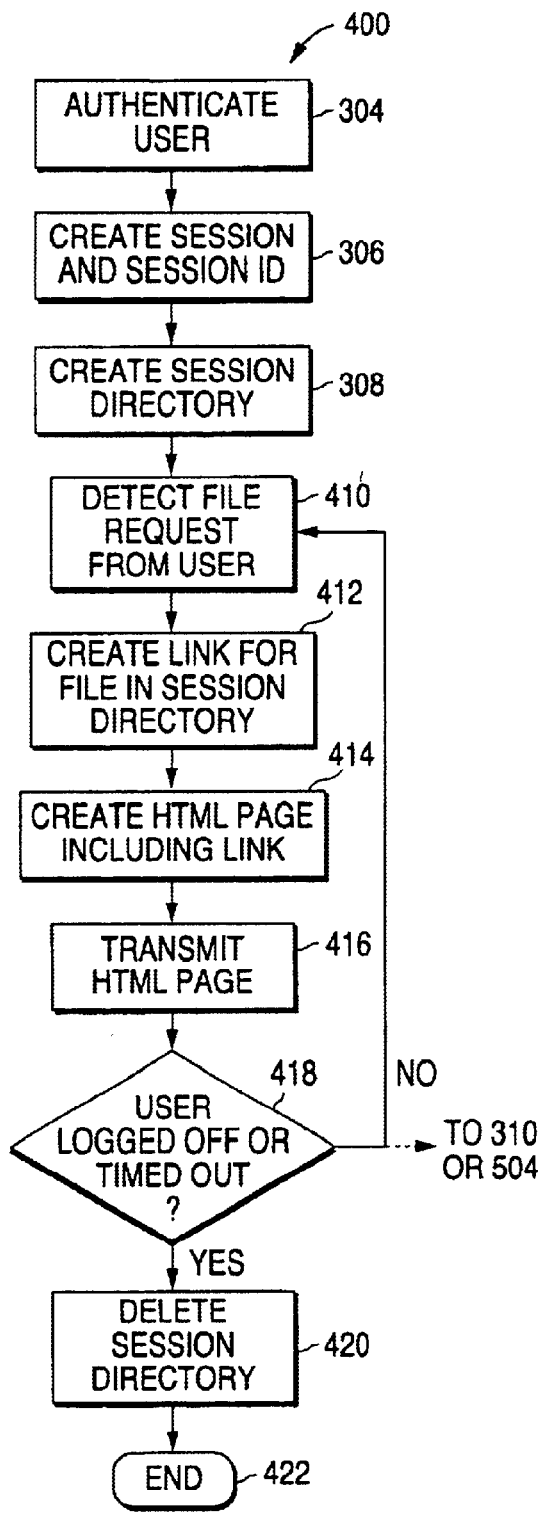

FIG. 3B shows a method 400 for downloading file 157. Method 400 includes the previously described actions 304, 306, and 308. Action 308 is followed by an action 410. In action 410, servlet 112 detects a request for a file 157 (FIG. 2B) (located in directory 154 in memory 142 of file server 14K) from the user on client computer 8I.

In one example, servlet 112 detects a request for file 157 when the user on client computer 8I selects a hypertext link to file 157 on an HTML page provided to client computer 8I. An exemplary HTML code for a hypertext link to file 157 on an HTML page is:

<a href="http://www.photoisland.com/servlet/servlet112?file_name=file157">File 157</a>.

Alternatively, an exemplary code for a hypertext link to file 157 encompassing an image instead of a text is:

<a href="http://www.photoisland.com/servlet/servlet112?file_name=file157"><img src=http://photoisland.com/photos/default.jpg"></a>.

Servlet 112 generates the above hypertext links in an HTML page provided to client computer 8I. To generate the above hypertext links, servlet 112 uses the user ID (previously saved as a session object) to query database 174 for a list of files which the user has permission to access. After determining the files the user has permission to access, servlet 112 constructs the above hypertext links with the file IDs of these files. When the user selects either of the above links, client computer 8I transmits a file name (e.g., "file157") to servlet 112 and calls for servlet 112 to execute and return the file (e.g., file 157). Co-filed U.S. patent application Ser. No. 09/545,366, entitled "Dynamic Web Page Authoring and Generation Using Static Templates" describes one method to create the above hypertext links in an HTML page.

After action 410, in an action 412, servlet 112 creates in session directory 114 a link 151 (FIG. 2B) to file 157, which is located in directory 154. Servlet 112 will only create link 151 for the user if the user ID passes a security check. The security check, for example, requires servlet 112 to determine if the user has permission to access file 157 by comparing the user ID against the user IDs that have permission to access file 157 in database 174. If the user ID does not pass the security check, servlet 112 does not create link 151.

In one implementation, where an operating system (OS) 110 (FIG. 2B) for web server 10J is a Unix based OS, servlet 112 creates a symbolic link 151 to file 157 using the following Unix command:

$ ln -s /dir154/file157.jpg http://www.photoisland.com/dir114/file157.jpg.

The above command generates a link between a network file path of "/dir154/file157.jpg" and "http://www.photoisland.com/dir114/file157.jpg."

In another implementation, where OS 110 is Windows NT, servlet 112 creates link 151 by writing a text file ("text link") including the network file path to file 157 in session directory 114. For example, servlet 112 creates link 151 for file 157 as a text file named "file157.jpg.txt" that includes (1) a Windows path of "f:\dir154\file157.jpg," where "f" represents a network drive mounted to web server 10J, or (2) a Unix UNC (universal name convention) path of "//10J/dir154/file157.jpg," where "10J" represents the server name. In one variation, servlet 112 determines whether to create a Unix symbolic link or an NT text link by detecting the OS. Action 412 is followed by action 414.

In action 414, servlet 112 creates HTML page 158 (FIG. 2B) including a hypertext link to link 151 with the following HTML codes:

<img src="http://www.photoisland.com/dir114/file157.jpg">.

In the implementation where OS 110 is Windows NT, a filter 120 (FIG. 2B) enables a server application 119 (FIG. 2B) of web server 10J to read the text link and retrieve file 157 from file server 14K according to the file path contained in the text link. Server application 119 is, for example, Microsoft® Internet Information Server (IIS). Filter 120 is described later in reference to FIG. 4. Action 414 is followed by action 416.

In action 416, server application 119 transmits HTML page 158 (and therefore file 157) to client computer 8I. Due to link 151, server application 119 sends file 157 to client computer 8I as if file 157 is located in session directory 114. Action 416 is followed by action 418. In action 418, servlet 112 determines if the user on client computer 8I has logged out or timed out. If the user has either logged out or timed out, action 418 is followed by action 420. Otherwise, action 418 is followed by action 410, or optionally by action 310 (FIG. 3A) or action 504 (described later in reference to FIG. 5). The user may select among actions 410, 310, and 504 via web pages provided by web server 10J. In action 420, servlet 112 deletes session directory 114. Action 420 is followed by action 422, which ends method 400.

Method 400 provides a secure method for file sharing through a web server. As described above, servlet 112 creates session directory 114 with a directory name based on the user ID and the session ID. Servlet 112 only saves link 151 to file 157 in session directory 114 and never file 157 itself. Thus, file 157 is never directly exposed to access over network 12. In addition, servlet 112 deletes session directory 114 after the user logs off or times out. For an unauthorized user to access file 157 from web server 10J, he or she must at least (1) log onto web server 10J at the same time as a first user, (2) know the directory name of session directory 114 (which requires knowing the user ID and session ID of the authorized user), and (3) know the name of file 157 in order to create or call upon link 151. Furthermore, servlet 112 verifies the user ID to see whether a user has permission to access file 157 before creating symbolic link 151.

Figure 4:
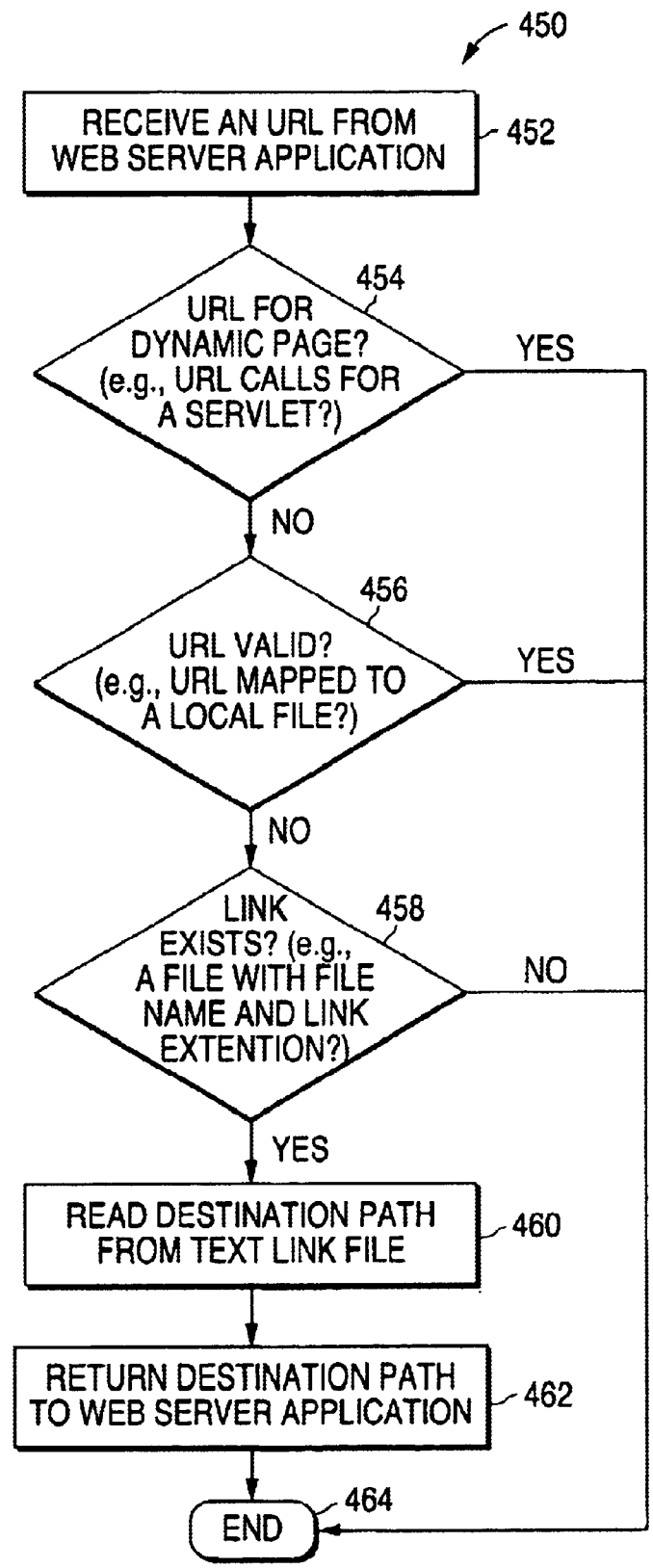
FIG. 4 is a flow chart illustrating the operation of the filter of FIG. 2B.

FIG. 4 shows a method 450 for filter 120 to enable server application 119 (FIG. 2B) of web server 10J to read text links. In an initial action 452, filter 120 receives an URL from server application 119. In the next action 454, filter 120 determines if the URL is for a dynamic page. For example, the URL is for a dynamic page if the URL calls for a servlet. If the URL is for a dynamic page, action 454 is followed by action 464, which ends the actions of filter 120. Otherwise, action 454 is followed by action 456.

In action 456, filter 120 determines if the URL is valid. The URL is valid if the URL is mapped to a local file on web server 10J. If the URL is valid, action 456 is followed by action 464, which ends the actions of filter 120. Otherwise, action 456 is followed by action 458. In action 458, filter 120 determines if a text link exists for the requested file. For example, a text link exists if filter 120 can find a file matching the requested file name with a link extension (e.g., "file154.jpg.txt"). If a text link exists, action 458 is followed by action 460. Otherwise, action 458 is followed by action 464, which ends the actions of filter 120.

If action 458 is followed by action 464, an error has occurred because the requested file is not located locally on web server 10J and a link has not been created for the requested file. In this situation, server application 119 returns an error message to the user on client computer 8I indicating the file cannot be located.

In one implementation, action 458 precedes action 456 because it may be more efficient to search for a link than to determine if an URL is mapped to a local file. If web server 10J does not store any files in memory 102, step 456 (determining whether a URL is mapped to a local file) is extraneous. However, action 456 is necessary in implementations where a web server locally stores some files.

In action 460, filter 120 reads the text link for a destination path. In the next action 462, filter 120 returns the destination path to web server application 119 so that it can send the requested file to the user on client computer 8I. Action 462 is followed by action 464, which ends process the actions of filter 120.

In an alternative embodiment, servlet 112 responds to a file request by directly retrieving file 157 from file server 14K and sending file 157 to the user on client computer 8I without creating a session directory or a link in the session directory. To provide security to this embodiment, servlet 112 determines if the user ID passes the security check each time servlet 112 receives a file request from the user. Contrary to a security check during the creation of the link in the session directory described above, this embodiment requires a security check every time the user requests the file. Performing the security check at each request adds processing overhead to web server 10J. Furthermore, using servlet 112 to send the requested file is not as efficient as using server application 119 to send the requested file as part of a web page because server application 119 is specifically designed to transfer web pages and files to client computer 8I over network 12.

Figure 5:
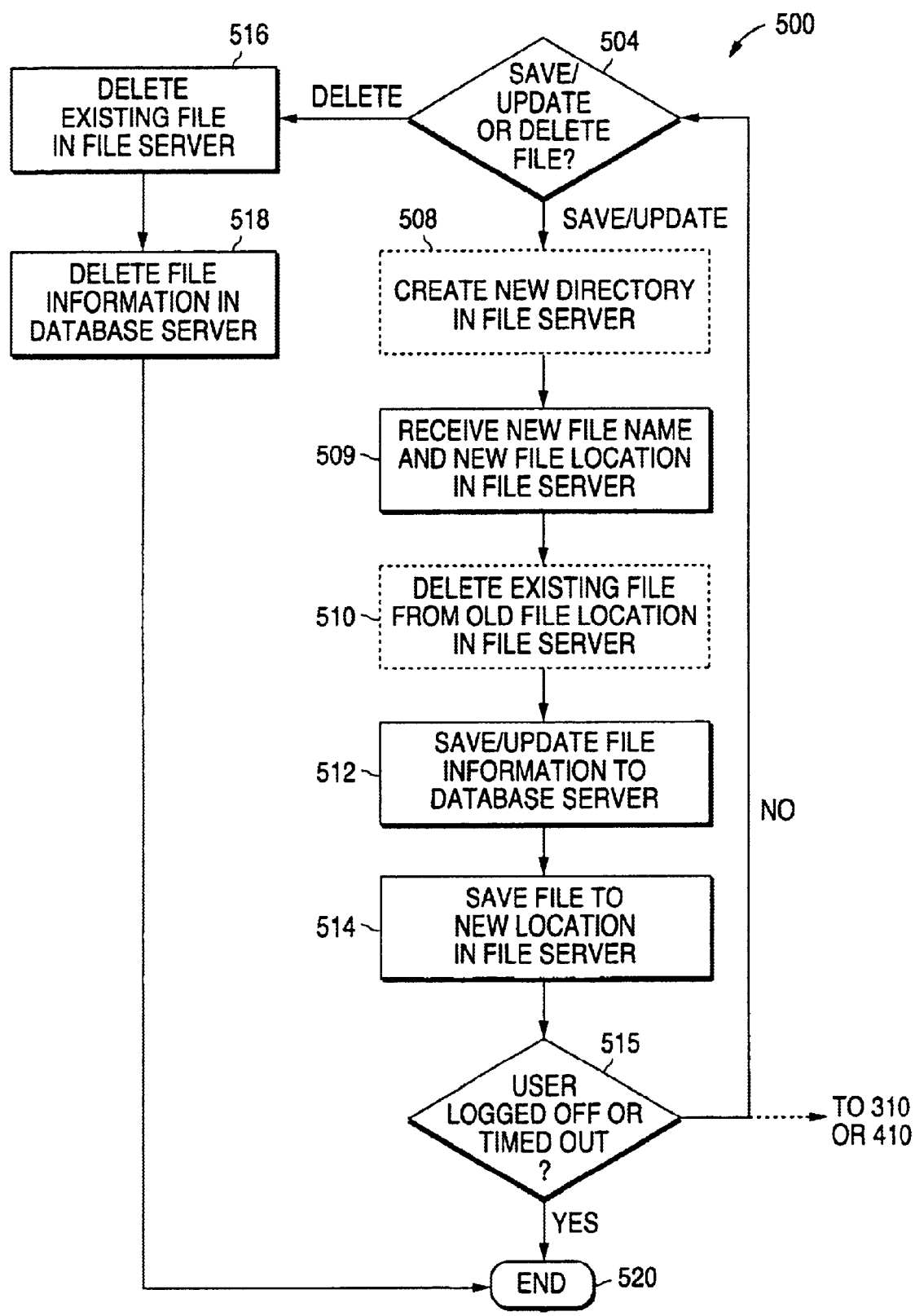
FIG. 5 is a flow chart illustrating the operation of the file management agent of FIG. 1.

FIG. 5 illustrates a method 500 for storing and deleting files. In an initial action 504, servlet 112 (FIG. 2B) of web server 10J determines whether the user on client computer 8I wants to save/update a file or delete a file. If the user wants to save/update a file, action 504 is followed by optional action 508. Otherwise, action 504 is followed by action 516.

In optional action 508, servlet 112 creates new directory 156 in file server 14K if database 174 determines that current directory 155 reaches a predetermined capacity (described later). Optional action 508 is followed by action 509. In action 509, servlet 112 receives a new file name and a new location to save file 157 in file server 14K by querying database 174 of database server 16 over intranet 20. Action 509 is followed by optional action 510. In optional action 510, servlet 112 deletes an old version of file 157 in file server 14K if file 157 is being updated. Servlet 112 queries and receives the file location of the old version of file 157 from database 174. Optional act 510 is followed by action 512.

In action 512, servlet 112 saves or updates file information 118 for file 157 by transmitting file information 118 to database server 16 over intranet 20. Action 512 is followed by action 514. In action 514, servlet 112 saves file 157 to the new file location in file server 14K. Action 514 is followed by action 515. In action 515, servlet 112 determines whether the user on computer 8I has logged off or timed out (e.g., was inactive for 30 minutes). If the user has either logged off or timed out, action 515 is followed by action 520, which ends method 500. Otherwise, action 515 is followed by action 504, or optionally by action 310 (FIG. 3A) or action 410 (FIG. 3B). The user may select among actions 504, 310, and 410 via web pages provided by web server 10J.

In action 516, servlet 112 deletes a file on file server 14K as requested by the user on client computer 8I. Servlet 112 queries and receives the file location of the to-be-deleted file from database 174. Action 516 is followed by action 518. In action 518, servlet 112 instructs database 174 to delete all information of the deleted file. Action 518 is followed by action 520, which ends method 500.

Figure 6:
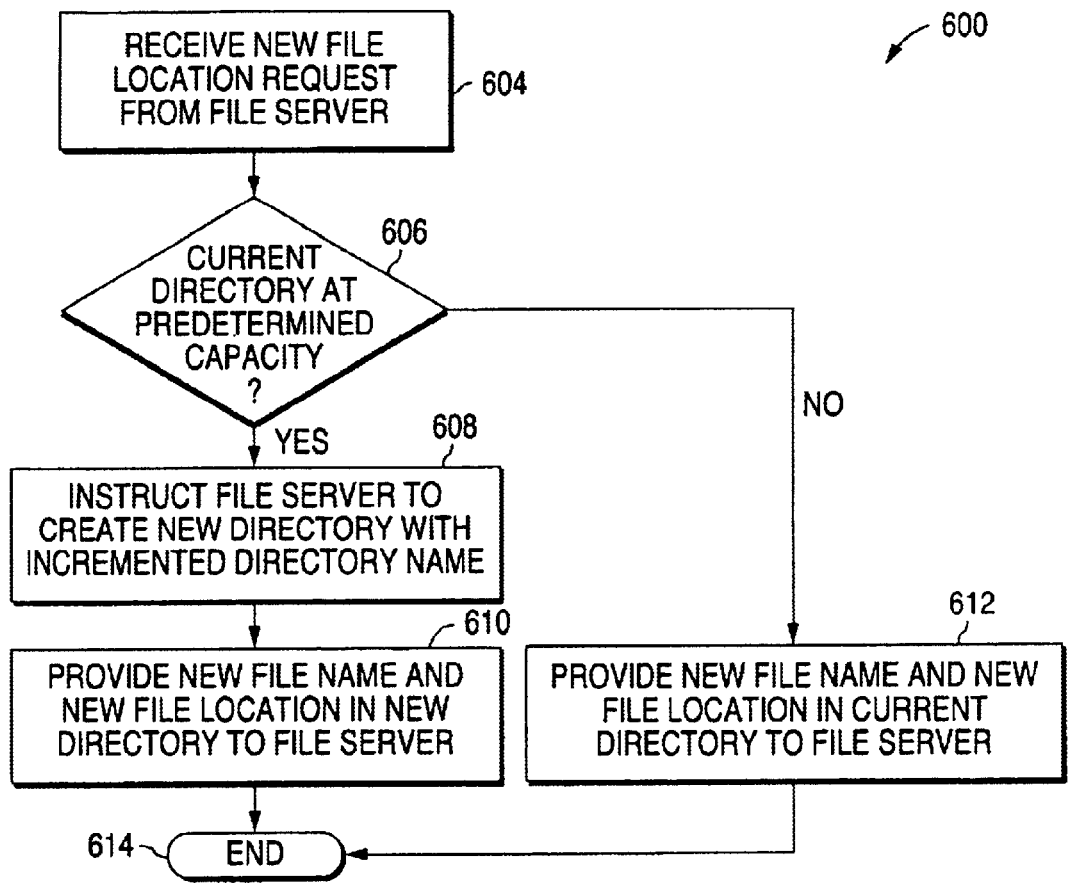
FIG. 6 is a flow chart illustrating the operation of the file control agent of FIG. 1.

FIG. 6 illustrates a method 600 (FIG. 6) for file control. In an initial action 604, database 174 (FIG. 2C) of database server 16 receives a new file location request for file 157 from servlet 112 of web server 10J. Action 604 is followed by action 606. In action 606, database 174 determines if the current directory, e.g., directory 155, has reached a predetermined capacity. Current directory 155 is the last directory created in memory 142 to store files. In one implementation, the directory is organized so that each directory name is sequentially incremented by a volume of, e.g., 100. For example, a first directory is named 12300, a second directory is named 12400, and so forth. The volume also represents the number of files the directory can contain. In other words, the volume is the predetermined capacity of the directory. In one variation, each file name is sequentially incremented by, e.g., 1. For example, a first file in directory 12300 is named 12300, the second file is named 12301, and so forth and up to the last file named 12399. If current directory 155 reaches the predetermined capacity, action 606 is followed by action 608. Otherwise, action 606 is followed by action 612.

In action 608, database 174 instructs servlet 112 to create a new directory, e.g., directory 156, in file server 14K. Action 608 corresponds to action 508 of FIG. 5, where servlet 112 creates a new directory in file server 14K. In one implementation, database 174 instructs servlet 112 to create directory 156 with a directory name that is incremented from the directory name of current directory 155. For example, if current directory 155 has a directory name of "12400" and directory names are incremented by a volume of 100, database 174 instructs servlet 112 to create new directory 156 with a directory name of "12500." Action 608 is followed by action 610. In action 610, database 174 provides a new file name and a new file location in new directory 156 where servlet 112 is to save file 157 in file server 14K. Action 610 corresponds to action 509 of FIG. 5, where servlet 112 receives the new file location from database 174. Action 610 is followed by action 614, which ends method 600. In action 612, database 174 provides a new file name and a new file location in current directory 155 where file servlet 112 is to save file 157 in file server 14K. Action 612 is followed by action 614, which ends method 600.

Method 600 provides a coherent directory system where the directory and file names are sequentially incremented. Such directory system is possible because the directories storing the files are in file server 14K instead of web server 10J and not exposed to direct access by client computer 8I from network 12.

Figure 7:
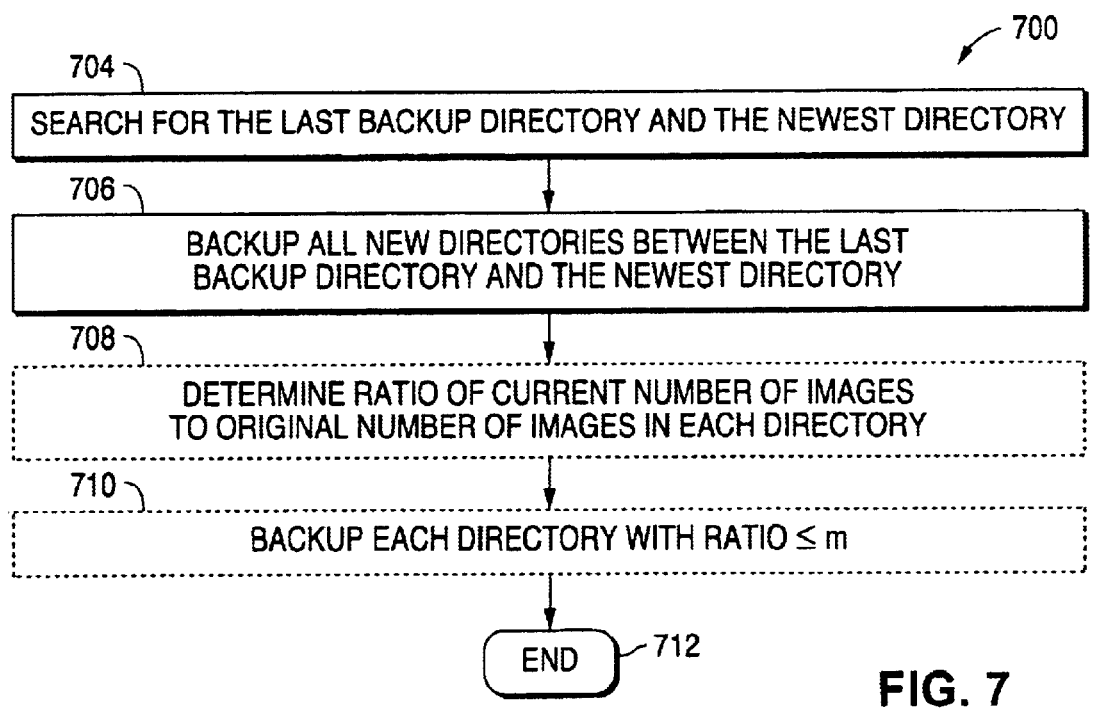
FIG. 7 is a flow chart illustrating the operation of the back up agent of FIG. 1.

FIG. 7 illustrates a method 700 for incremental backup. In an initial action 704, a backup application 159 (FIG. 2B) on file server 14K determines the last directory, e.g., directory 154, that was backed up and the newest directory, e.g., directory 156. Backup application 159 determines the last directory and the newest directory by querying database 174 (FIG. 2C) of database server 16. In the next action 706, backup application 159 backups all directories created between the last directory, e.g., directory 154, and the newest directory, e.g., directory 156. For example, if last directory 154 has a directory name of "12300," the newest directory 156 has a directory name of "12500," and the directories names are incremented by volume of 100, backup application 159 will backup a directory with the directory, name of "12400," e.g., directory 155. Backup application 159 backs up directory 155 (FIG. 2B) to memory 182 (e.g., a hard disk storage) of back up server 18 (FIG. 2C) over network 20.

In one implementation, backup application 159 centrally backs up file servers 14A to 14P to backup server 18. Alternatively, file servers 14A to 14P each has a backup application such as backup application 159 that individually backs up the respective file servers to backup server 18. Backup application 159 is, for example, ARCserv®IT from Computer Associates of Islandia, N.Y. Action 706 is followed by optional action 708.

In optional action 708, backup application 159 determines the ratio of the current number of images and the original number of images in each directory. Backup application 159 queries database 174 to determine the current number and the original number of images in each directory. Optional action 708 is followed by optional action 710. In optional action 710, backup application 159 backs up all directories to memory 182 of back up server 18 where the ratio of current number of images to the original number of images are less than M. M is, for example, 0.5. Optional action 710 is followed by action 712, which ends method 700.

Method 700 provides a simple way to back up file server 14K. As directory names are sequentially incremented, backup application 159 only needs to know the directory names of the last directory that was backed up (e.g., directory 154) and the newest directory (e.g., directory 156) to determine directories that need to be backed up. By backing up again the directories where the ratio of the current number of files to the original number of files are less than M, method 700 provides fast restoration of these directories should the need arise.

Figure 8:
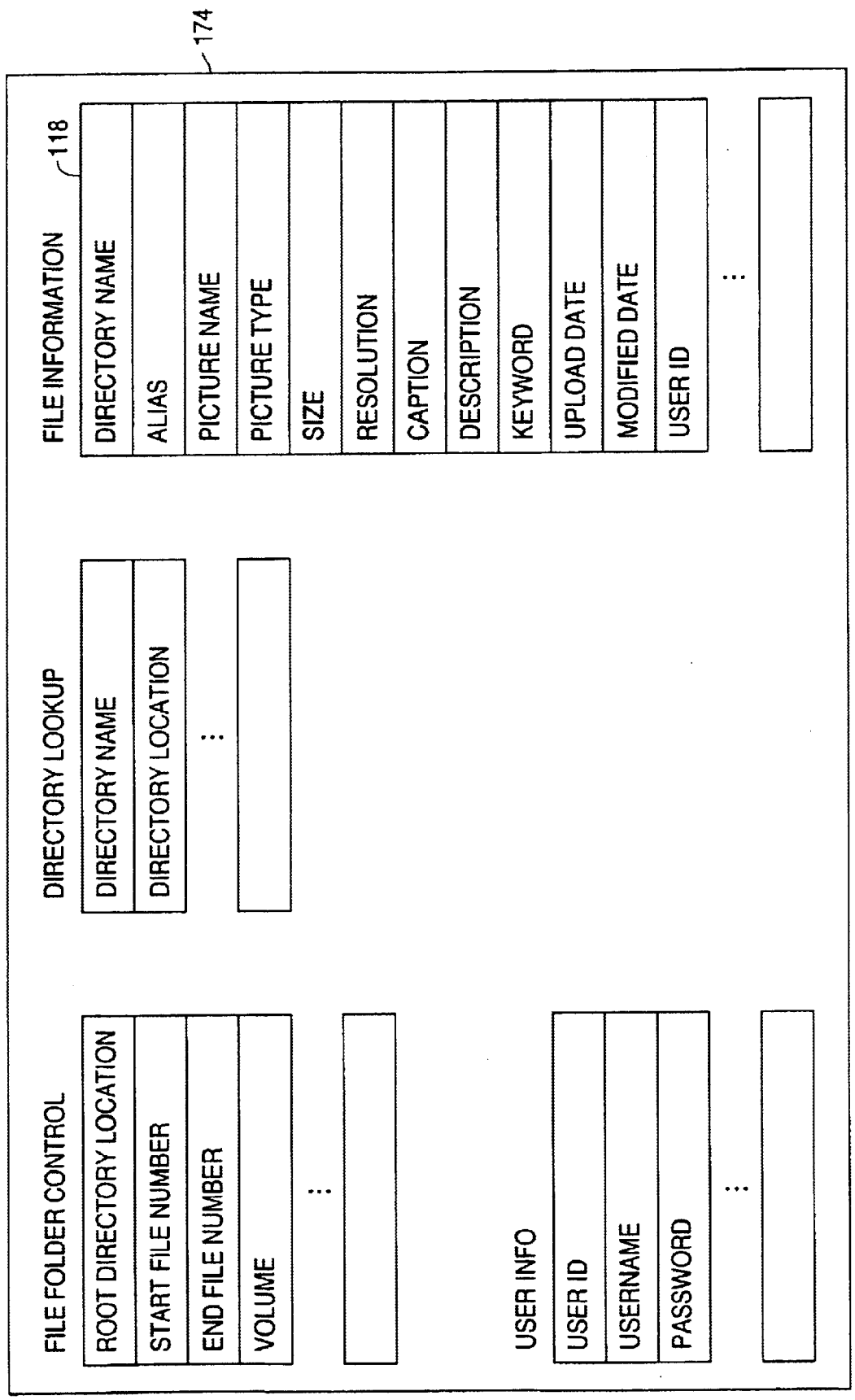
FIG. 8 is a diagram of the database of FIG. 2C.

FIG. 8 illustrates the contents of database 174. Database 174 includes a file folder control that stores the root directory location, the start file number, the end file number, and the volume for each directory. The root directory location indicates the root directory where the directories created to save files are located. The start file number indicates the start of the file names while the end file number indicates the end of the file names. The volume indicates the number of files to be saved in each directory and the number by which the directory names are sequentially incremented by. For example, the following is an entry in the file folder control table:

| /data1/imagehome | 12300 | 123000 | 100. |
|---|---|---|---|

In the above example, the root directory is "/data1/imagehome," the file names start at "12300" and end on "122999", and the directories contain 100 files each. In the above example, directories will be created using the start file number and the end file number. For example, as the volume is 100, the first directory will be named 12300, the second directory will be named 12400, the third directory will be named 12500, and so forth until reaching a directory name of 123000. Directory 12300 will contain files named from 12300 to 12399, directory 12400 will contain files named from 12400 to 12499, directory 12500 will contain files named from 12500 to 12599, and so forth until reaching a file name of 122999. When the file names reach 122999 and directory names reach 123000, another entry into the file folder control is created to set a new root directory location, a new start file number, a new end file number, and a new directory volume. For example, the following is another entry in the file folder control table:

| /data2/imagehome | 123000 | 1230000 | 100. |
|---|---|---|---|

In the above example, the root directory is "/data2/imagehome," the file names start at "123000" and end on "1229999", and the directories contain 100 files each. In the above example, directories will be created using the start file number and end file number, where the names of the directories are incremented by the volume.

Database 174 also includes a directory look up table. The directory look up table comprises the directory name and the directory location for each directory. A directory location includes the entire path to the directory with the corresponding directory name. Database 174 further includes a file information table for each file. In one example, each file is an image file, and the file information table includes for each image file a directory name of the directory where the image file is stored, an alias, a picture type, a picture name, a picture size, a resolution (e.g., 640×480), a caption, a description of the image file, searchable keywords, an upload date, a last modified date, and an user ID for access permission. The alias is the file name given by a user during upload of the picture file to web server 10J. The picture name is the file name given by database 174. The picture type identifies the file format of the picture, such as JPEG (joint photographic expert group) and GIF (graphics interchange format). The picture type may include the file name and an extension that identifies the file format, e.g., "12300.jpg."

Although the invention has been described with reference to particular embodiments, the description is only an example of the invention's application and should not be taken as a limitation. In particular, even though much of preceding discussion was aimed at NT, Unix, and HTML descriptions, alternative embodiments of this invention may be adapted to other operating systems and languages that may evolve for network file sharing. In addition, the functions of servlet 112 can be divided among other servlets. Furthermore, additional applications running on the servers described above or additional application servers may be added to the system to process the uploaded files. For example, applications may provide image processing to uploaded image files. Various other adaptations and combinations of features of the embodiments disclosed are within the scope of the invention as defined by the following claims.

We claim:

1. A method for file sharing over a first network, comprising:

authenticating a user on a first computer connected to a second computer by the first network;

creating a temporary directory on the second computer if the user is authenticated, wherein the temporary directory has at least a partially random directory name;

receiving a request for a first file from the user on the first computer to the second computer, wherein the first file is on a third computer connected to the second computer by a second network;

determining whether the user on the first computer is permitted access to the first file;

creating a symbolic link in the temporary directory on the second computer if the user is permitted access, wherein the symbolic link points to the first file on the third computer;

creating a web page description including an URL comprising a path to the first file in the temporary directory on the second computer;

transmitting the web page description to the first computer via the first network; and deleting the temporary directory on the second computer.

2. The method of claim 1, wherein the symbolic link is a Unix symbolic link.

3. The method of claim 1, wherein the symbolic link is a text file containing a path to the first file on the third computer, wherein said transmitting the web page description includes reading the text file in the temporary directory and in response to the text file retrieving the first file on the third computer to the first computer.

4. The method of claim 1, further comprising creating a random session identification for the user on the first computer subsequent to said authenticating a user and prior to said creating a temporary directory, wherein the at least partially random directory name comprises at least partially of the session identification.

5. The method of claim 1, further comprising:

determining if a second directory on the third computer has reached a predetermined capacity; and if the second directory has reached the predetermined capacity, creating on the third computer a third directory with a third directory name that is sequentially incremented from a second directory name of the second directory.

6. The method of claim 1, further comprising the acts of:

searching for a second directory on the third computer that was last backed up and a third directory that was most recently created; and backing up all directories on the third computer having directory names sequentially between a second directory name of the second directory and a third directory name of the third directory.

7. The method of claim 1, further comprising backing up a second directory on the third computer that was previously backed up if the number of files currently in the second directory is substantially less than the original number of files in the second directory.

8. The method of claim 7, wherein the number of files currently in the second directory is substantially less than the original number of files in the second directory if the ratio of the number of files currently in the second directory to the original number of files in the second directory is less than a predetermined amount.

9. The method of claim 1, further comprising:
receiving a second file form the first computer to the second computer; and
moving the second file to the third computer.

10. The method of claim 9, further comprising saving the second file in the third computer with a file name that is sequentially incremented from a file name of a file that was previously saved in the third computer.

* * * * *

UNITED STATES PATENT AND TRADEMARK OFFICE
CERTIFICATE OF CORRECTION

PATENT NO. : 6,856,989 B1 Page 1 of 1
DATED : February 15, 2005
INVENTOR(S) : Ming Zhou, Wenbing Zhang and Chien-yu Lin It is certified that error appears in the above-identified patent and that said Letters Patent is hereby corrected as shown below:

Column 12,
Line 4, where "a second file form" should read -- a second file from --.
Line 9, where "a file name of a file" should read -- a file name of a third file --.

Signed and Sealed this

Nineteenth Day of July, 2005

JON W. DUDAS
*Director of the United States Patent and Trademark Office*